United States Patent
Xu et al.

(10) Patent No.: US 10,251,099 B2
(45) Date of Patent: Apr. 2, 2019

(54) METHOD AND APPARATUS FOR ENHANCING INTER-MENB HANDOVER WITHOUT SENB CHANGE IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/656,506

(22) Filed: Jul. 21, 2017

(65) Prior Publication Data
US 2018/0027457 A1    Jan. 25, 2018

Related U.S. Application Data

(60) Provisional application No. 62/365,393, filed on Jul. 22, 2016.

(51) Int. Cl.
*H04W 36/00* (2009.01)
*H04W 36/08* (2009.01)
*H04W 88/10* (2009.01)

(52) U.S. Cl.
CPC ... *H04W 36/0027* (2013.01); *H04W 36/0069* (2018.08); *H04W 36/08* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 9,867,107 B2* | 1/2018 | Fujishiro | H04W 16/32 |
| 2014/0349694 A1* | 11/2014 | Raghothaman | H04W 36/00 455/509 |
| 2015/0312811 A1* | 10/2015 | Lei | H04W 36/0055 370/331 |
| 2016/0157156 A1* | 6/2016 | Chen | H04W 36/28 370/331 |
| 2016/0174111 A1* | 6/2016 | Zhu | H04W 36/0033 370/331 |
| 2016/0373972 A1* | 12/2016 | Vesely | H04W 36/0033 |
| 2017/0134998 A1* | 5/2017 | Xu | H04W 36/0055 |
| 2018/0049091 A1* | 2/2018 | Wang | H04W 36/18 |
| 2018/0084464 A1* | 3/2018 | Ozturk | H04W 76/25 |
| 2018/0115926 A1* | 4/2018 | Wu | H04W 36/00 |

* cited by examiner

*Primary Examiner* — Ajit Patel
(74) *Attorney, Agent, or Firm* — Lee Hong Degerman Kang Waimey (57) ABSTRACT

In an inter-master eNB (MeNB) handover procedure without secondary eNB (SeNB) change, a user equipment (UE) receives a SeNB kept indicator indicating that a SeNB has been kept successfully from a source MeNB. Upon receiving the SeNB kept indicator, the UE determines that the SeNB has been kept successfully in the inter-MeNB handover without SeNB change, and skips the random access procedure to the SeNB.

12 Claims, 11 Drawing Sheets

METHOD AND APPARATUS FOR ENHANCING INTER-MENB HANDOVER WITHOUT SENB CHANGE IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/365,393, filed on Jul. 22, 2016, the contents of which are hereby incorporated by reference herein in its entirety.

BACKGROUND OF THE INVENTION

Field of the Invention

The present invention relates to wireless communications, and more particularly, to a method and apparatus for enhancing an inter-master eNodeB (MeNB) handover without secondary eNB (SeNB) change in a wireless communication system.

Related Art

The 3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto eNodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

As the dual connectivity has been introduced, various scenarios for handover may happen. Specifically, when one secondary eNB (SeNB) in dual connectivity is shared by two master eNBs (MeNBs), inter-MeNB handover without SeNB change may happen. Accordingly, a method for performing inter-MeNB handover without SeNB may be required.

SUMMARY OF THE INVENTION

The present invention provides a method and apparatus for enhancing an inter-master eNodeB (MeNB) handover without secondary eNB (SeNB) change in a wireless communication system. The present invention provides a method for skipping an unnecessary random access procedure to the SeNB in the inter-MeNB handover without SeNB change.

In an aspect, a method for skipping a random access procedure to a secondary eNodeB (SeNB), by a user equipment (UE), in an inter-master eNB (MeNB) handover without SeNB change in a wireless communication system is provided. The method includes receiving, by the UE, a SeNB kept indicator indicating that a SeNB has been kept successfully in the inter-MeNB handover without SeNB change from a source MeNB, determining, by the UE, that the SeNB has been kept successfully in the inter-MeNB handover without SeNB change according to the SeNB kept indicator, and skipping, by the UE, the random access procedure to the SeNB.

In another aspect, a user equipment (UE) in a wireless communication system is provided. The UE includes a memory, a transceiver, and a processor, coupled to the memory and the transceiver, that controls the transceiver to receive a secondary eNodeB (SeNB) kept indicator indicating that a SeNB has been kept successfully in an inter-master eNB (MeNB) handover without SeNB change from a source MeNB, determines that the SeNB has been kept successfully in the inter-MeNB handover without SeNB change according to the SeNB kept indicator, and skips a random access procedure to the SeNB.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
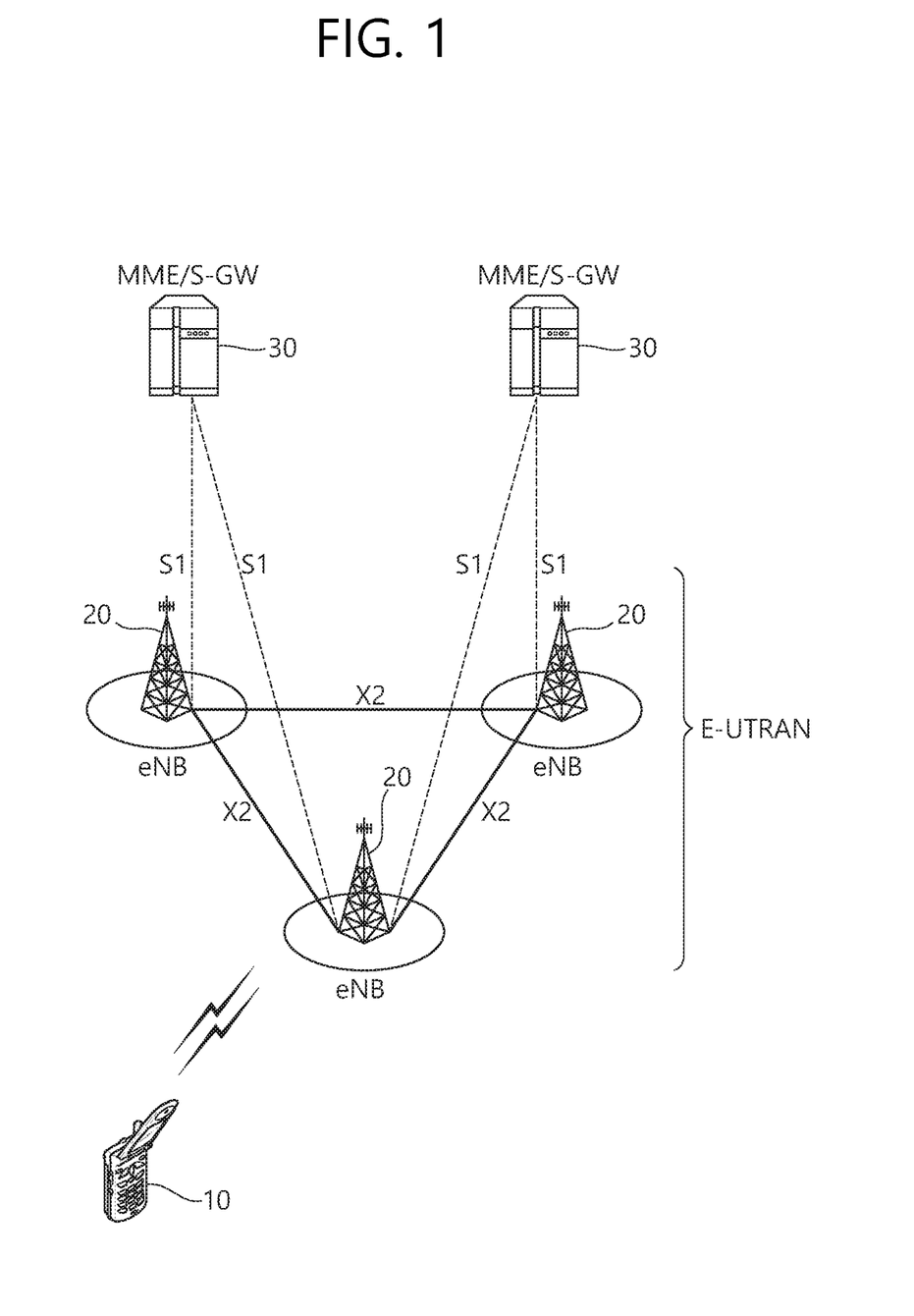
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Overall architecture and network interface for dual connectivity (DC) is described. It may be referred to 3GPP TR 36.842 V12.0.0 (2013-12). The E-UTRAN may support dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

Figure 2:
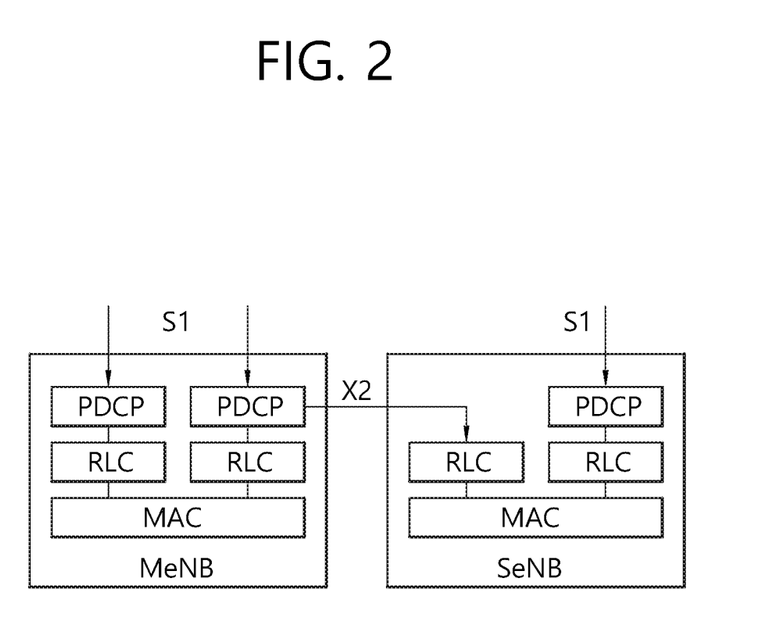
FIG. 2 shows radio protocol architecture for dual connectivity.

FIG. 2 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 2, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

Figure 3:
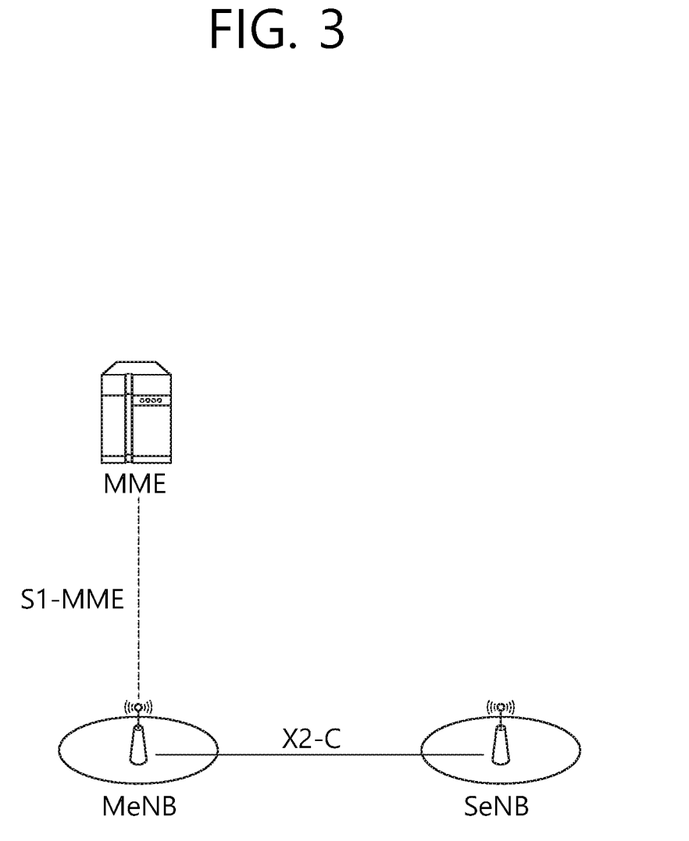
FIG. 3 shows C-plane connectivity of eNBs involved in dual connectivity for a certain UE.

FIG. 3 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 3, the MeNB is C-plane connected to the MME via S1-MME, the MeNB and the SeNB are interconnected via X2-C.

Figure 4:
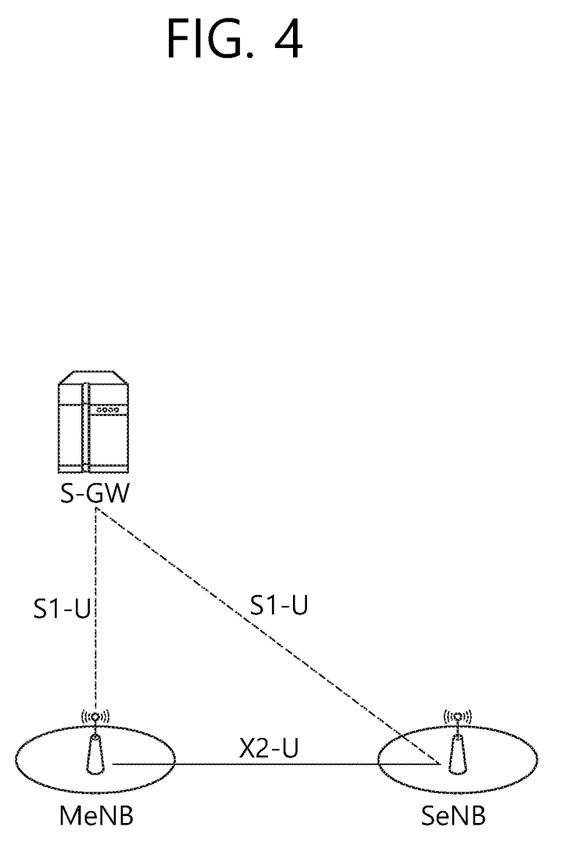
FIG. 4 shows U-plane connectivity of eNBs involved in dual connectivity for a certain UE.

FIG. 4 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

Figure 5:
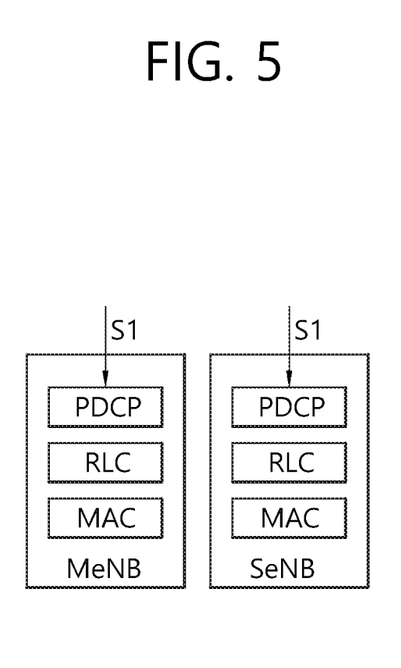
FIG. 5 shows an example of U-plane architecture for dual connectivity.

FIG. 5 shows an example of U-plane architecture for dual connectivity. U-plane architecture for dual connectivity shown in FIG. 5 is the combination of S1-U that terminates in SeNB and independent PDCPs (no bearer split).

Figure 6:
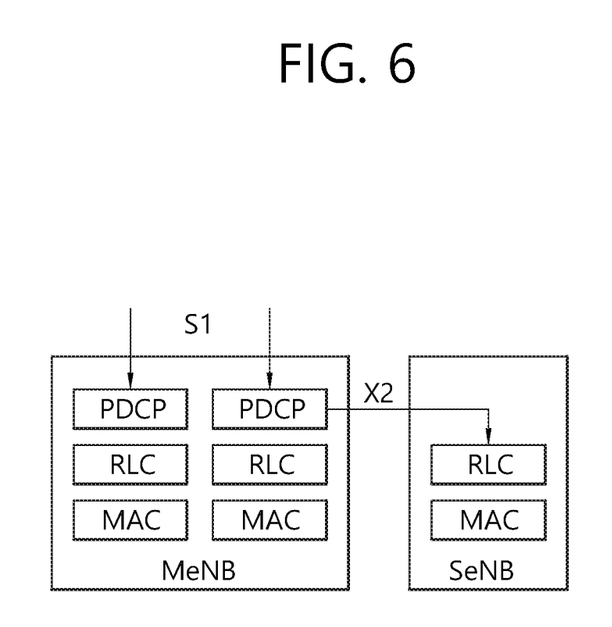
FIG. 6 shows another example of U-plane architecture for dual connectivity.

FIG. 6 shows another example of U-plane architecture for dual connectivity. U-plane architecture for dual connectivity shown in FIG. 6 is the combination of S1-U that terminates in MeNB, bearer split in MeNB, and independent RLCs for split bearers.

The corresponding UE architecture may be also changed to support the new feature.

Figure 7:
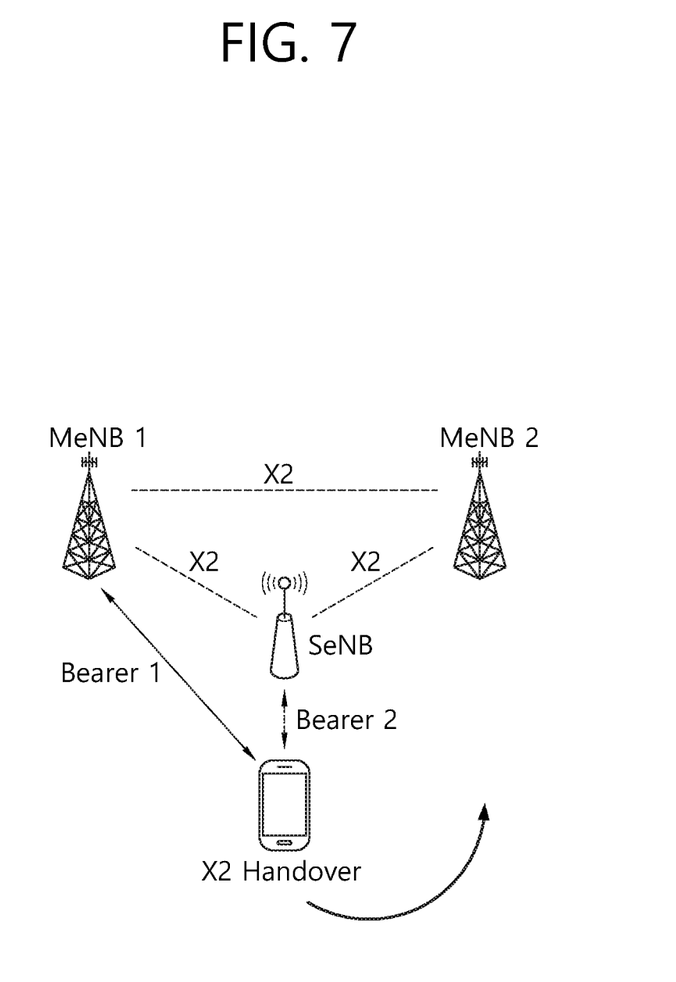
FIG. 7 shows an example of a deployment scenario with a common SeNB shared by two MeNBs.

FIG. 7 shows an example of a deployment scenario with a common SeNB shared by two MeNBs. Referring to FIG. 7, a UE is receiving dual connectivity service via bearer 1 from MeNB 1, and via bearer 2 from SeNB. The UE may be handed over to the neighbor MeNB, i.e. MeNB 2, which shares the SeNB with the MeNB 1. Accordingly, an inter-MeNB handover procedure without SeNB change was defined in 3GPP Rel-13, in order to keep the SeNB in an inter-MeNB handover.

Figure 8:
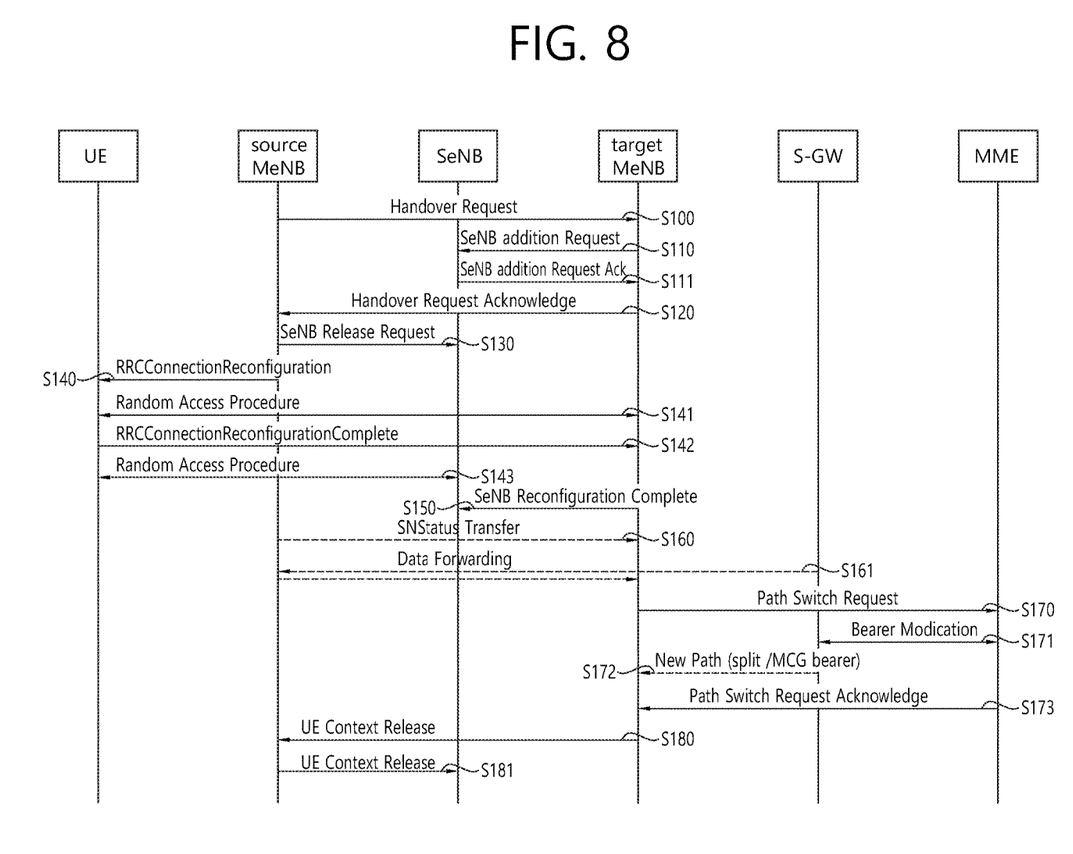
FIG. 8 shows a method for performing an inter-MeNB handover without SeNB change.

FIG. 8 shows a method for performing an inter-MeNB handover without SeNB change.

In step S100, the source MeNB starts the handover procedure by initiating the X2 handover preparation procedure. The source MeNB includes the SCG configuration in the HandoverPreparationInformation. The source MeNB includes the SeNB UE X2AP ID and SeNB ID as a reference to the UE context in the SeNB that was established by the source MeNB in the Handover Request message.

If the target MeNB decides to keep the SeNB, in step S110, the target MeNB sends SeNB Addition Request message to the SeNB including the SeNB UE X2AP ID as a reference to the UE context in the SeNB that was established by the source MeNB.

In step S111, the SeNB replies with SeNB Addition Request Acknowledge message to the target MeNB.

In step S120, the target MeNB includes within the Handover Request Acknowledge message a transparent container to be sent to the UE as an RRC message to perform the handover which also includes the SCG configuration, and may also provide forwarding addresses to the source MeNB. The target MeNB indicates to the source MeNB that the UE context in the SeNB is kept if the target MeNB and the SeNB decided to keep the UE context in the SeNB in step S110 and S111.

In step S130, the source MeNB sends the SeNB Release Request message to the SeNB. The source MeNB indicates to the SeNB that the UE context in SeNB is kept. If the indication as the UE context kept in SeNB is included, the SeNB keeps the UE context.

In step S140, the source MeNB triggers the UE to apply the new configuration.

In step S141, the UE synchronizes to the target MeNB. In step S142, the UE replies with RRCConnectionReconfigurationComplete message to the target MeNB.

In step S143, the UE synchronizes to the SeNB.

In step S150, if the RRC connection reconfiguration procedure was successful, the target MeNB informs the SeNB by transmitting the SeNB Reconfiguration Complete message to the SeNB.

In steps S160 and S161, data forwarding from the source MeNB takes place. Data forwarding may be omitted for SCG bearers. Direct data forwarding from the source MeNB to the SeNB is not possible for split bearers. Direct data forwarding may occur only for bearer type change.

From steps S170 to S173, the target MeNB initiates the S1 path switch procedure. If new UL tunnel endpoint IDs (TEIDs) of the S-GW are included, the target MeNB performs MeNB initiated SeNB modification procedure to provide them to the SeNB.

In step S180, the target MeNB initiates the UE context release procedure towards the source MeNB.

In step S181, upon reception of the UE context release message, the SeNB can release C-plane related resource associated to the UE context towards the source MeNB. Any ongoing data forwarding may continue. The SeNB shall not release the UE context associated with the target MeNB if the indication was included in the SeNB Release Request in step S130.

The inter-MeNB handover procedure without SeNB change shown in FIG. 8 can optimize the inter-MeNB handover procedure while keeping a SeNB. However, one problem of the above procedure is that the Uu related procedure has not been optimized thoroughly. Specifically, since the SeNB is kept, a random access procedure to the SeNB (i.e. step S143 in FIG. 8) may seem to be unnecessary. But, according to the legacy procedure, the random access procedure is always performed, which causes unnecessary signaling.

In order to solve the problem described above, the present invention proposes a method for enhancing the inter-MeNB handover procedure without SeNB change. According to an embodiment of the present invention, an unnecessary random access to the SeNB may be skipped in the inter-MeNB handover procedure without SeNB change.

Figure 9:
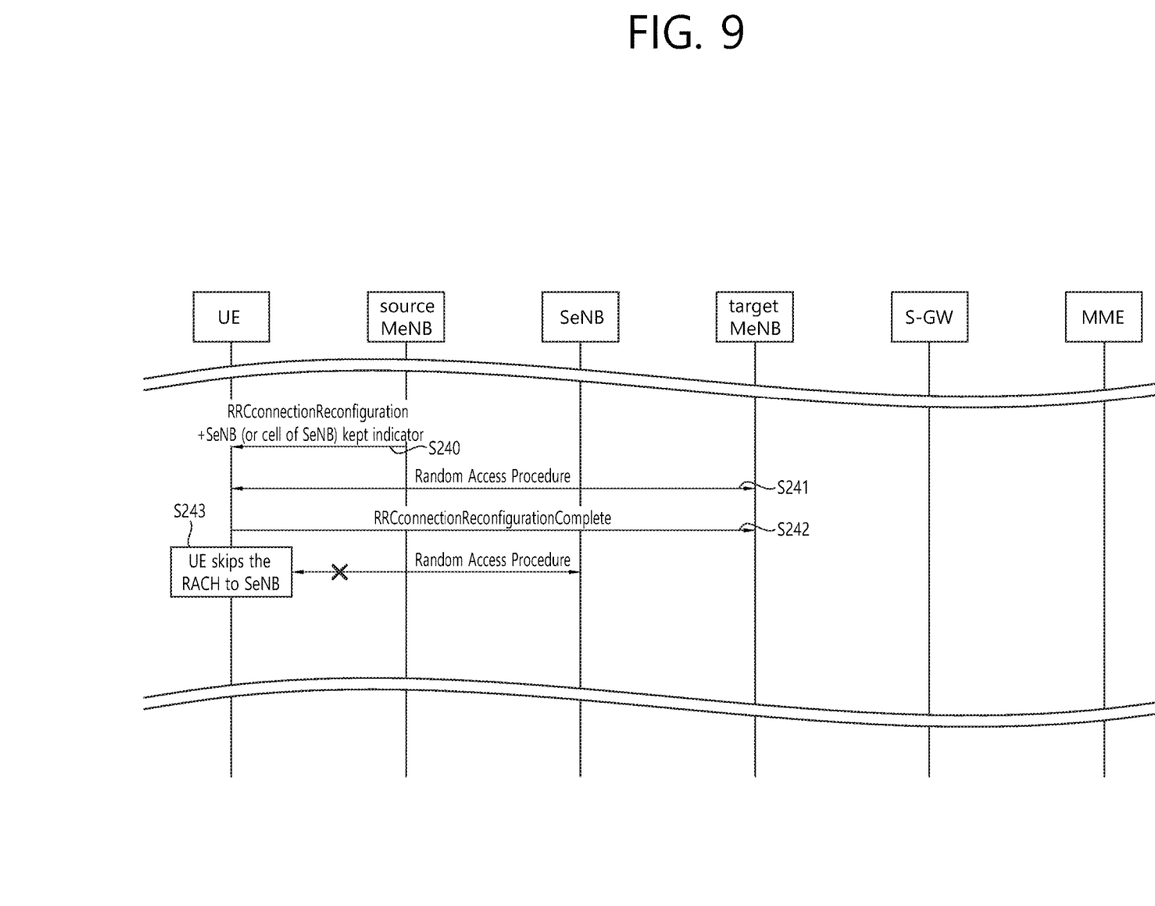
FIG. 9 shows a method for skipping a random access procedure to a SeNB in an inter-MeNB handover without SeNB change according to an embodiment of the present invention.

FIG. 9 shows a method for skipping a random access procedure to a SeNB in an inter-MeNB handover without SeNB change according to an embodiment of the present invention. For the convenience, only steps from S240 to S243 are described in FIG. 9. Before step S240, steps from S100 to S130 shown in FIG. 8 can be performed. Further, after step S243, steps from S150 to S181 shown in FIG. 8 can be performed. In other words, steps from S240 to S243 in FIG. 9 can replace steps from S140 to S143 in FIG. 8, for the present invention.

In step S240, the source MeNB triggers the UE to apply the new configuration by transmitting the RRCConnectionReconfiguration message to the UE. The RRCConnectionReconfiguration message may include a SeNB (or cells of SeNB) kept indicator. The SeNB (or cells of SeNB) kept indicator may indicate to the UE that the SeNB on source side has been kept successfully in the inter-MeNB handover without SeNB change. Further, the new configuration included in the RRCConnectionReconfiguration message may include the configuration of the target MeNB and also the configuration of the SeNB, which has been successfully kept. Further, the cell IDs of the MCG and the cell IDs of the SeNB may also be included in the RRCConnectionReconfiguration message. The cell IDs may correspond to an E-UTRAN cell global ID (ECGI) or a physical cell ID (PCI).

When the UE applies the new configuration received via the RRCConnectionReconfiguration message, the UE can know whether the SeNB is kept or not according to the SeNB (or cells of SeNB) kept indicator included in the RRCConnectionReconfiguration message. Also, the UE can know whether the SeNB is kept or not by comparing the cell IDs (ECGI/PCI) of the SeNB included in the newly received configuration with the cell IDs of the SeNB used for dual connectivity before the inter-MeNB handover procedure without SeNB change. If the cell IDs (ECGI/PCI) of the SeNB included in the newly received configuration and the cell IDs of the SeNB used before the inter-MeNB handover procedure without SeNB change is identical, then the UE can know that the SeNB has been kept successfully.

In step S241, the UE synchronizes to the target MeNB. In step S242, the UE replies with RRCConnectionReconfigurationComplete message to the target MeNB.

If the UE judges that the SeNB has been kept successfully, then the random access procedure to the SeNB is skipped. So, the UE does not need to synchronize to the SeNB.

Figure 10:
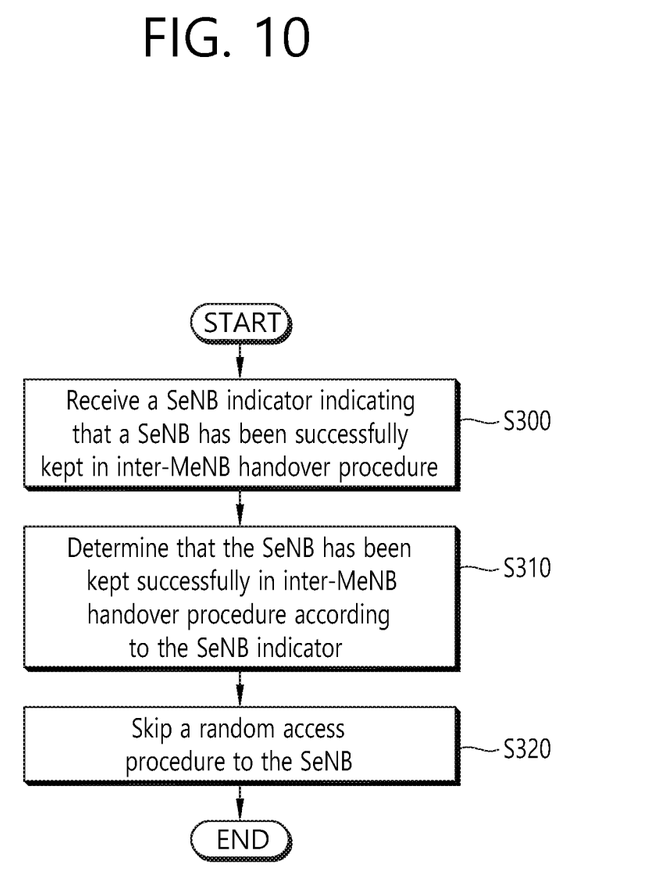
FIG. 10 shows a method for skipping a random access procedure to a SeNB in an inter-MeNB handover without SeNB change according to another embodiment of the present invention.

FIG. 10 shows a method for skipping a random access procedure to a SeNB in an inter-MeNB handover without SeNB change according to another embodiment of the present invention. The present invention described above may be applied to this embodiment.

In step S300, the UE receives a SeNB kept indicator indicating that a SeNB has been kept successfully in the inter-MeNB handover without SeNB change from a source MeNB. The SeNB kept indicator may be received via a RRC connection reconfiguration message. The RRC connection reconfiguration message may include a new configuration, which includes a configuration of a target MeNB and a configuration of the SeNB. The RRC connection reconfiguration message may include cell IDs of a MCG and cell IDs of the SeNB. The cell IDs may correspond to one of an ECGI or a PCI.

In step S310, the UE determines that the SeNB has been kept successfully in the inter-MeNB handover without SeNB change according to the SeNB kept indicator. Also, the UE may determine that the SeNB has been kept successfully in the inter-MeNB handover without SeNB change, by comparing the cell IDs of the SeNB with cell IDs used before the inter-MeNB handover without SeNB change.

In step S320, the UE skips the random access procedure to the SeNB.

Figure 11:
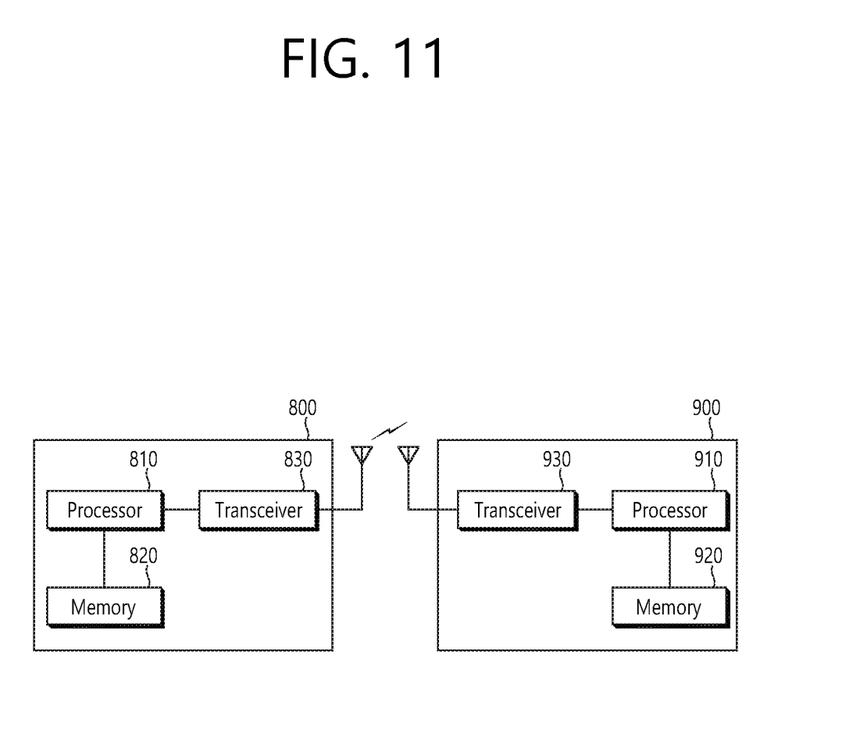
FIG. 11 shows a wireless communication system to implement an embodiment of the present invention.

FIG. 11 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, an unnecessary random access to the SeNB can be skipped in the inter-MeNB handover procedure without SeNB change, thereby the inter-MeNB handover procedure without SeNB change can be optimized in Uu interface.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for a user equipment (UE) in a wireless communication system, the method comprising:
   receiving, by the UE from a source master eNB (MeNB), a information informing that a secondary eNodeB (SeNB) has been kept successfully in an inter-MeNB handover without SeNB change;
   determining, by the UE, that the SeNB has been kept successfully in the inter-MeNB handover without SeNB change based on the information; and
   skipping, by the UE, a random access procedure to the SeNB based on the determining that the SeNB has been kept successfully in the inter-MeNB handover without SeNB change.

2. The method of claim 1, wherein the information is received via a radio resource control (RRC) connection reconfiguration message.

3. The method of claim 2, wherein the RRC connection reconfiguration message includes a new configuration, which includes a configuration of a target MeNB and a configuration of the SeNB.

4. The method of claim 2, wherein the RRC connection reconfiguration message includes cell identifiers (IDs) of a master cell group (MCG) and cell IDs of the SeNB.

5. The method of claim 4, wherein the cell IDs corresponds to one of an E-UTRAN cell global ID (ECGI) or a physical cell ID (PCI).

6. The method of claim 4, further comprising determining, by the UE, that the SeNB has been kept successfully in the inter-MeNB handover without SeNB change, by comparing the cell IDs of the SeNB with cell IDs used before the inter-MeNB handover without SeNB change.

7. A user equipment (UE) in a wireless communication system, the UE comprising:
- a memory;
- a transceiver; and
- a processor, coupled to the memory and the transceiver, that:
  - controls the transceiver to receive, from a source master eNB (MeNB), information informing that a secondary eNodeB (SeNB) has been kept successfully in an inter-master eNB (MeNB) handover without SeNB change,
  - determines that the SeNB has been kept successfully in the inter-MeNB handover without SeNB change based on the information, and
  - skips a random access procedure to the SeNB based on the determining that the SeNB has been kept successfully in the inter-MeNB handover without SeNB change.

8. The UE of claim 7, wherein the information is received via a radio resource control (RRC) connection reconfiguration message.

9. The UE of claim 8, wherein the RRC connection reconfiguration message includes a new configuration, which includes a configuration of a target MeNB and a configuration of the SeNB.

10. The UE of claim 8, wherein the RRC connection reconfiguration message includes cell identifiers (IDs) of a master cell group (MCG) and cell IDs of the SeNB.

11. The UE of claim 10, wherein the cell IDs corresponds to one of an E-UTRAN cell global ID (ECGI) or a physical cell ID (PCI).

12. The UE of claim 10, wherein the processor further determines that the SeNB has been kept successfully in the inter-MeNB handover without SeNB change, by comparing the cell IDs of the SeNB with cell IDs used before the inter-MeNB handover without SeNB change.

* * * * *